(12) United States Patent
Yang (10) Patent No.: US 8,496,417 B1
(45) Date of Patent: Jul. 30, 2013

(54) ADJUSTABLE BINDING BELT SET

(75) Inventor: Cheng-Chiang Yang, Taichung (TW)

(73) Assignee: Great Taiwan Material Handling Co., Taichung (TW)

( * ) Notice: Subject to any disclaimer, the term of this patent is extended or adjusted under 35 U.S.C. 154(b) by 0 days.

(21) Appl. No.: 13/481,870

(22) Filed: May 28, 2012

(51) Int. Cl.
*B60P 7/08* (2006.01)

(52) U.S. Cl.
USPC .......................................................... 410/51

(58) Field of Classification Search
USPC ............. 410/51, 97, 100; 414/448; 280/47.27
See application file for complete search history.

(56) References Cited

U.S. PATENT DOCUMENTS

| 2,623,760 | A | * | 12/1952 | Fornelius | ........................ 410/51 |
| 5,137,403 | A | * | 8/1992 | McCaffrey | ...................... 410/51 |

* cited by examiner

*Primary Examiner* — Stephen Gordon (57) ABSTRACT

An adjustable binding belt set includes a binding belt, a fastening component and a handling bar. The handling bar has a spine tube which is passing through an axial rod. A gear on the spine tube is engaged with a switching component. A first spring hole is defined on a handling component. The first spring hole has a spring component placed into and controls the engagement between the gear and the gear tuner. The fastening component includes a fastening base and a fastening slice. The fastening base has an assembling groove defined thereon. The fastening slice is pivoted on the assembling groove. A gear stopper is extruded from the fastening slice and engaged with the gear. The fastening slice further has a resisting part extruded therefrom. Thus, the binding belt is automatically or manually to fasten the goods on a cart when a user operates the handling bar.

7 Claims, 8 Drawing Sheets

ADJUSTABLE BINDING BELT SET

BACKGROUND OF THE INVENTION

1. Field of the Invention

The present invention relates to a binding belt, and more particularly to an adjustable binding belt set for handcarts.

2. Description of Related Art

People move their house to a more appropriate place to live. However, in the past, how to handle numerous of packages and furniture was really a big deal. The moving service companies were available; but, due to the personal privacy, people tended to carry some packages like underwear or something important by their own.

Today, package cases with wheels to drag are commercially available but one package case cannot provide much space to pack all things. Thus, people further use the carts to deliver those package cases because many package cases can be moved by only a cart at the same time.

The conventional modified cart, especially concerned to those with two/four wheels switching function, has a pair of sliding blocks to connect the main stick on the both sides of the cart with the pulling stick. A positioning stick with a locking fastener is set on the middle part of the main stick to lock the axial stick located on the bottom of the pulling stick. In this way, the original two wheels cart can be changed to a four wheels cart with loading plate by unlocking the locking fastener.

Unfortunately, when the cart loads too many goods, some rope, rubber belt or mechanic tightening belt is necessary to prevent the goods falling from the cart, but to wrap/unwrap the rope, rubber belt or mechanic tightening belt often costs a lot of time.

The present invention has arisen to mitigate and/or obviate the disadvantages of the conventional modified cart.

SUMMARY OF THE INVENTION

The main objective of the present invention is to provide an improved adjustable binding belt set for handcarts.

To achieve the objective, an adjustable binding belt set comprises a handling bar, a fastening component and a binding belt, the handling bar pivoted on a axial rod of a cart body, the handling bar having a spine tube, a switching component and a handling component defined thereof, the spine tube passing through the axial rod of the cart body, a gear defined on the outer part of the spine tube to engage with the switching component, a gear tuner extruded from the switching component, the gear tuner engaged with the gear, two first positioning depressions defined on the switching component, the first positioning depressions opposite to the gear tuner, the handling component assembled to the switching component, the handling component located opposite to the gear tuner, a first spring hole corresponding to the switching component defined on the handling component, the first spring hole having a spring component placed into, one end of the spring component selectively abutted against each of the first positioning depressions to control the motion of the gear tuner, the fastening component assembled to the cart body and near the spine tube, the fastening component comprising a fastening base and a fastening slice, one side of the fastening base corresponding to the gear having an assembling groove defined thereon, the fastening slice pivoted on the assembling groove, a gear stopper extruded from one side of the fastening slice, the gear stopper engaged with the gear, another side of the fastening slice having a resisting part extruded therefrom, the resisting part being used to fix the gear from rotating; wherein when the gear stopper of the fastening slice is engaged with the gear, the elongated binding belt will not roll back automatically; after goods are packaged by the binding belt, the gear stopper of the fastening slice is tuned to separate from the gear such that the binding belt will roll back automatically and tightly fasten the packages; on the other hand, if the resisting part of the fastening slice is engaged with the gear and the switching component is also engaged with the gear, simultaneously, the handling bar will not swing because of the engagement among the resisting part, the gear and the switching component.

The spring component comprises a first positioning ball and a first spring. One end of the first spring is abutted against the bottom of the first spring hole. Another end of the first spring is abutted against the first positioning ball. The first positioning ball is selectively abutted against each of the first positioning depressions of the switching component due to the elastic force from the first spring. Thereby, a user tunes the switching component to make the gear tuner engage or disengage with the gear.

A second spring hole is defined inside the assembling groove of the fastening base. The second spring hole is located opposite to the fastening slice. A second spring and a second positioning ball are placed inside the second spring hole. Two second positioning depressions are defined adjacent to each other on one side of the fastening slice which is pivoted on the assembling groove. The second positioning ball is selectively abutted against each of the second positioning depressions. One end of the second spring is abutted against the bottom of the second spring hole. Another end of the second spring abutted against the second positioning ball. When the user tunes the fastening slice, the second positioning ball will abut against the corresponding second positioning depression; the force generated from the engagement of the resisting part and the gear will compensates with the force generated from engagement of the gear tuner and the gear, and further fasten the switching component instead of swing freely.

Two cover slices are set on both side of the handling component of the handling bar. A passing hole is defined on each cover slice. The spine tube is passing through the passing hole. Each cover slice is locked at the top and the bottom of the handling component. The switching component is pivoted between two cover slices.

A protecting wear is covering the handling component. The protecting wear is located opposite to the spring component. The ends of the cover slices are coated by the protecting wear.

A flexible component is further passing through the axial rod. One end of the flexible component is assembled to the cart body. Another end of the flexible component is locked at the handling bar. Thereby, an additional elastic force will generated from the flexible component, and this force will fix the handling bar instead of swing freely.

A roll-back rod is defined on the axial rod and the binding belt is assembled inside the roll-back rod. Two blocks are defined at each end of the roll-back rod; the distance between the two blocks is larger than the width of the belt to receive the rolled-back belt completely. The cross section area of each block is larger than the cross section area of a rolled-back belt.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 1-4, an adjustable binding belt set in accordance with the present invention which is assembled at an axial rod 11 on a cart body 1 comprises a handling bar 2 and a fastening component 3, and a binding belt (not numbered).

The handling bar 2 is pivoted on the axial rod 11. The handling bar 2 has a spine tube 21, a switching component 22 and a handling component 23 defined thereof. The spine tube 21 is passing through the axial rod 11 of the cart body 1. A gear 211 is defined on the outer part of the spine tube 21 to engage with the switching component 22.

A gear tuner 221 is extruded from the switching component 22. The gear tuner 221 is engaged with the gear 211. Two first positioning depressions 222 are defined on the switching component 22. The first positioning depressions 222 are opposite to the gear tuner 221.

The handling component 23 is assembled to the switching component 22. The handling component 23 is located opposite to the gear tuner 221. A first spring hole 231 corresponding to the switching component 22 is defined on the handling component 23. The first spring hole 231 has a spring component 24 placed into. One end of the spring component 24 is selectively abutted against each of the first positioning depressions 222 to control the motion of the gear tuner 221.

The fastening component 3 is assembled to the cart body 1 and near the spine tube 21. The fastening component 3 comprises a fastening base 31 and a fastening slice 32. One side of the fastening base 31 corresponding to the gear 211 has an assembling groove 311 defined thereon. The fastening slice 32 is pivoted on the assembling groove 311.

A gear stopper 321 is extruded from one side of the fastening slice 32. The gear stopper 321 is engaged with the gear 211. Another side of the fastening slice 32 has a resisting part 323 extruded therefrom. The resisting part 323 is used to fix the gear 211 from rotating.

In this arrangement, when the gear stopper 321 of the fastening slice 32 is engaged with the gear 211, the elongated binding belt will not roll back automatically. After goods are packaged by the binding belt, the gear stopper 321 of the fastening slice 32 is tuned to separate from the gear 211 such that the binding belt will roll back automatically and tightly fasten the packages; on the other hand, if the resisting part 323 of the fastening slice 32 is engaged with the gear 211 and the switching component 22 is also engaged with the gear 211, simultaneously, the handling bar 2 will not swing because of the engagement among the resisting part 323, the gear 211 and the switching component 22.

Figure 4:
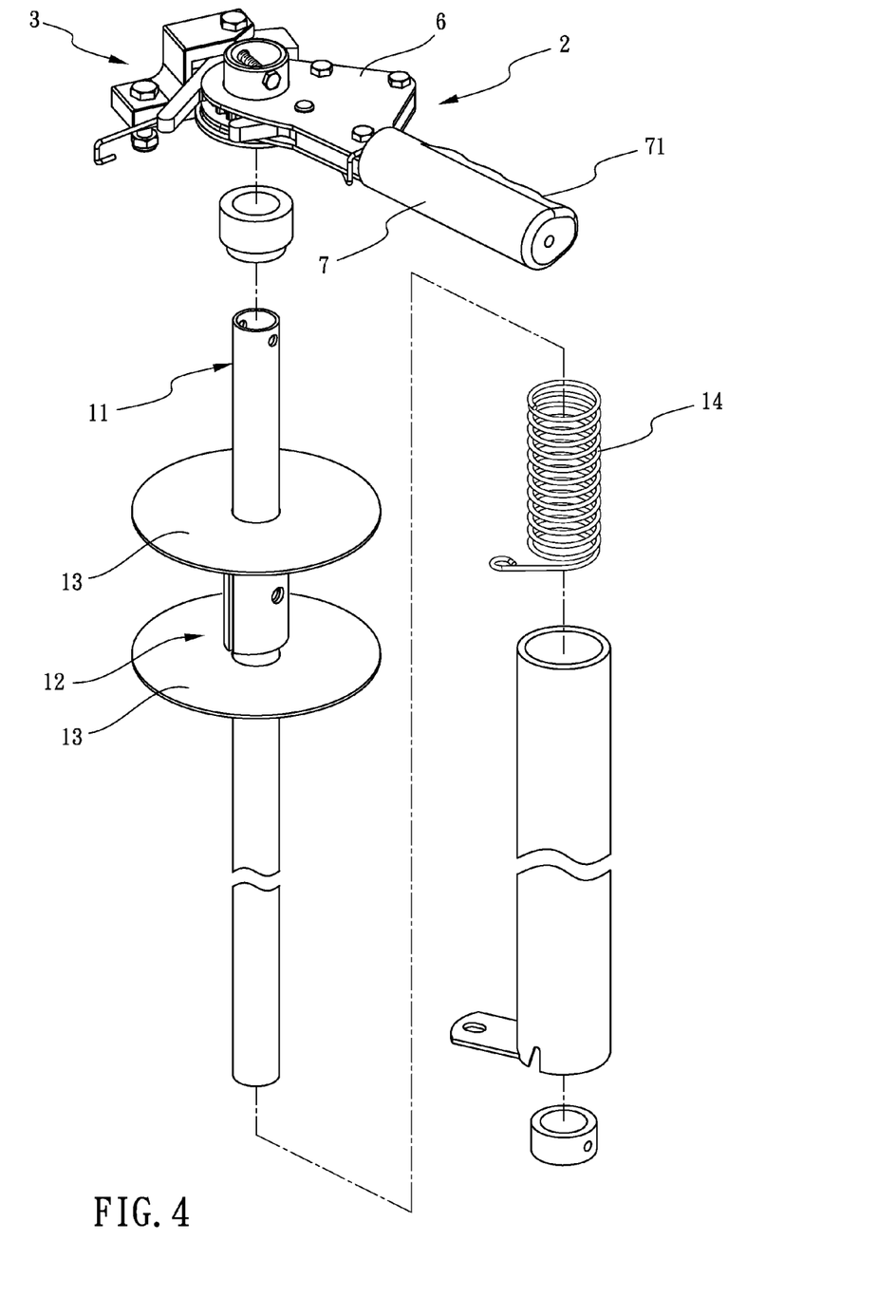
FIG. 4 is an exploded view of an axial rod of the adjustable binding belt set.
Figure 5:
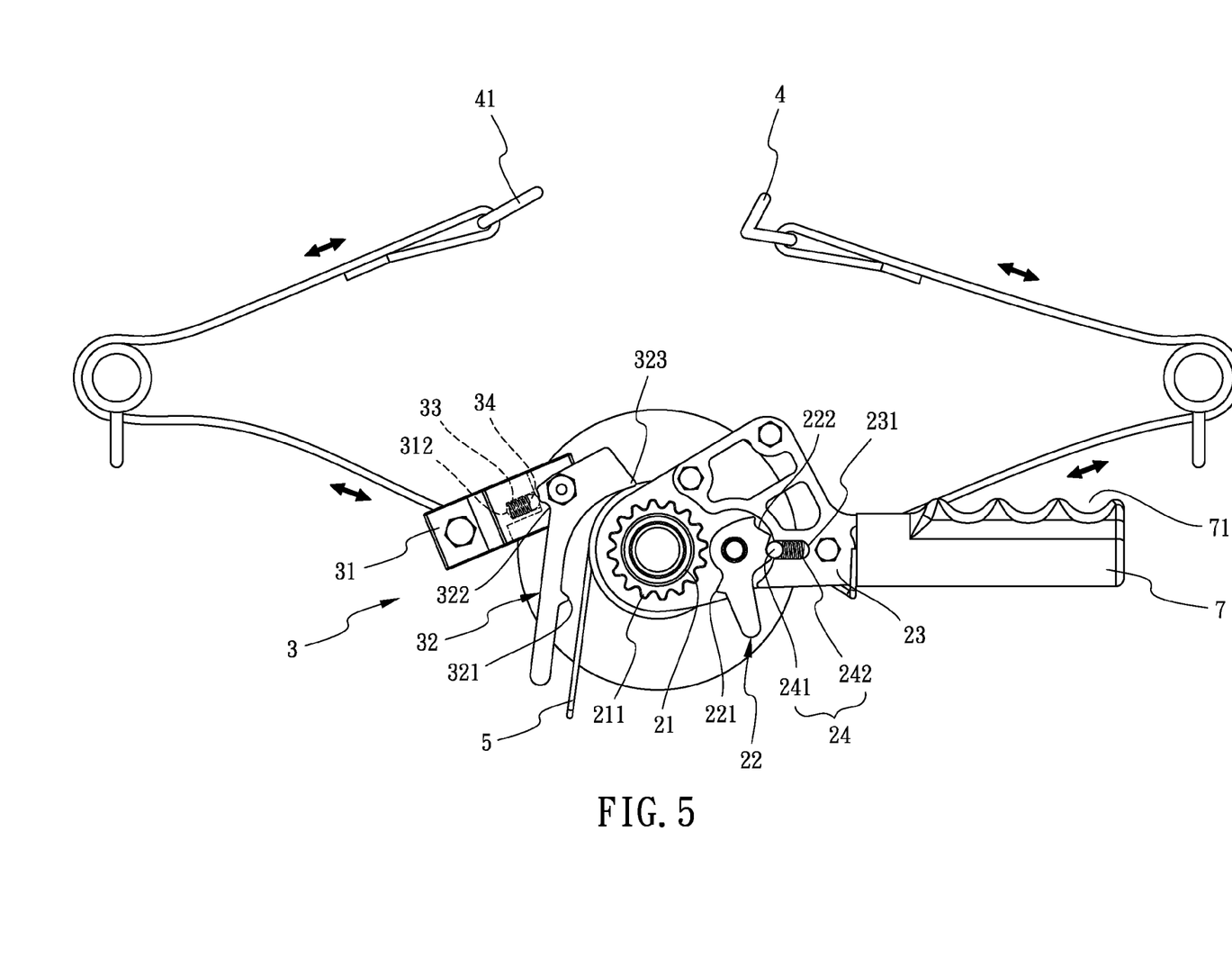
FIG. 5 is a top side view for showing that a binding belt is elongated.
Figure 6:
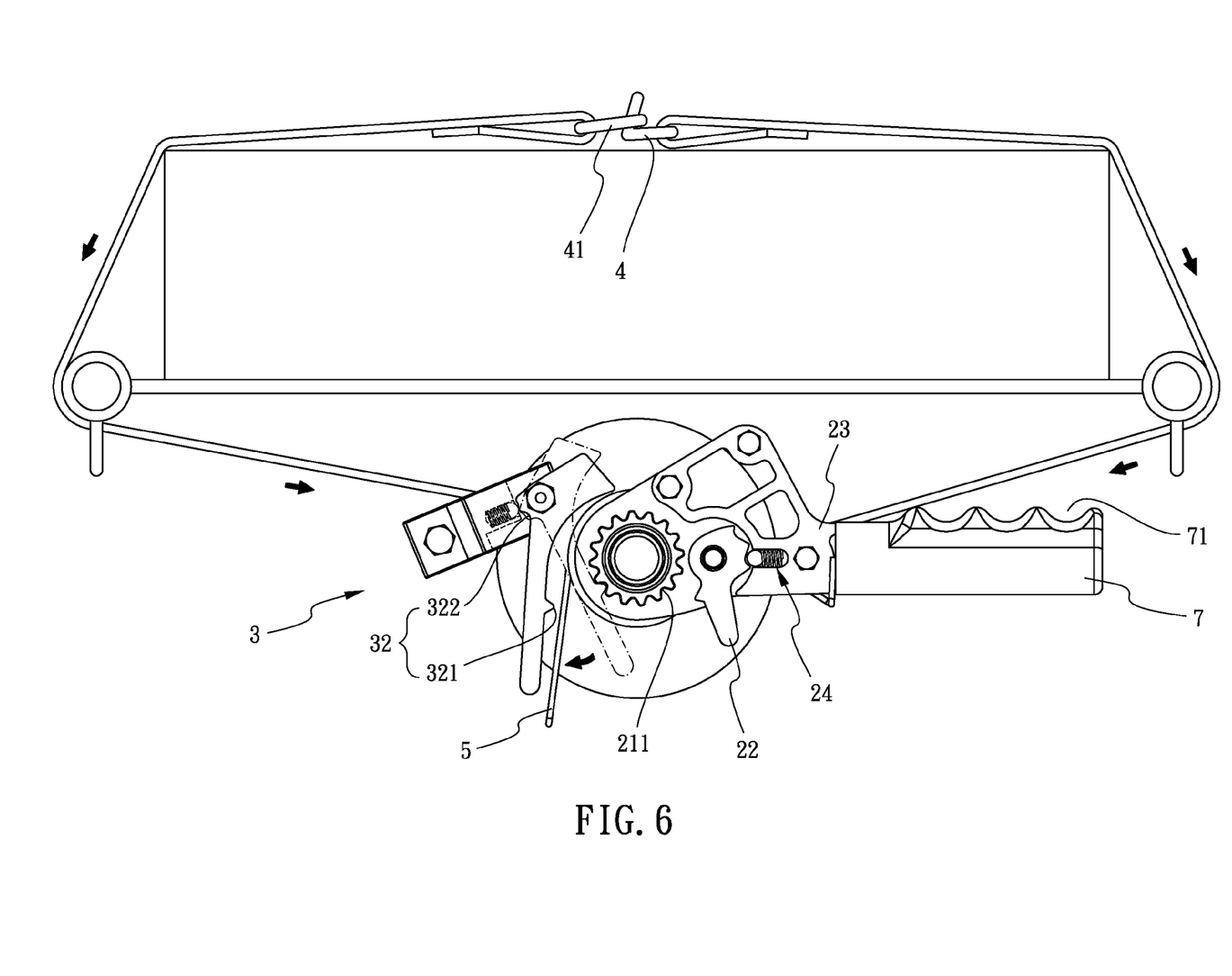
FIG. 6 is a top side view for showing the operation of automatically fastening the binding belt.

In order to fasten the goods stably on the cart body 1, the binding belt is elongated to an appropriate length, and the gear stopper 321 of the fastening slice 32 is tuned to engage with the gear 211 to prevent the binding belt from rolling back automatically, a male fastener 4 is defined on one side of the binding belt, and a female fastener 41 is defined on another side of the binding belt. A torsion spring 14 is passing through the axial rod 11. The torsion ring is opposite to the handling bar 2 (shown in FIGS. 4-6). To fasten the goods with the binding belt, the steps are taken as following:

Firstly, a user surrounds the goods with the elongated binding belt.

Secondly, the user connects the male fastener 4 with the female fastener 41.

Thirdly, the user tunes the fastening slice 32 to separate the gear stopper 321 from the gear 211.

In this arrangement, the torsion force generated from the torsion spring 14 will roll back the binding belt, and tighten the goods, so that the goods are packed well finally.

Referring to FIGS. 1-5 and 7-8, the user can adjust the binding belt by manual operation to fasten the goods on the cart body 1. Firstly, the user should extend the binding belt to an appropriate length and bind the goods with the extending binding belt. Secondly, the user should connect the male fastener 4 with the female fastener 41. Thirdly, the user should tune the switching component 22 to make the gear tuner 221 engage with the gear 211 of the spine tube 21. Fourthly, the user should tune the handling bar 2 to make the gear 211 of the spine tube 21 be boosted in one direction by the switching component 22. The spine tube 21 rotates when the gear 211 rotates, and the rotation of the spine tube 21 drives the rotation of the axial rod 11. The binding belt is set on the axial rod 11 so that the rotation of the axial rod 11 drives the binding belt to roll back. In addition, because the male fastener 4 and female fastener 41 are setting on both ends of the binding belt and combining together, the rolling-back binding belt will gradually tighten the goods until the goods will stably stay on the cart body 1. When the cart body 1 is moving on an unsmooth road, the shaking of the cart body 1 will cause the disengagement between the switching component 22 and the gear 211. To prevent the gear 211 disengaged from the switching component 22, the fastening slice 32 should be tuned to engage the resisting part 323 of the fastening slice 32 with the gear 211 after the goods are fastened well with the binding belt. In this arrangement, the force generated from the engagement of the resisting part 323 and the gear 211 compensates with the force generated from engagement of the gear tuner 221 and the gear 211. Thus, the disengagement between the switching component 22 and the gear 211 can be prevented when the cart body 1 is moving on the unsmooth road.

Figure 7:
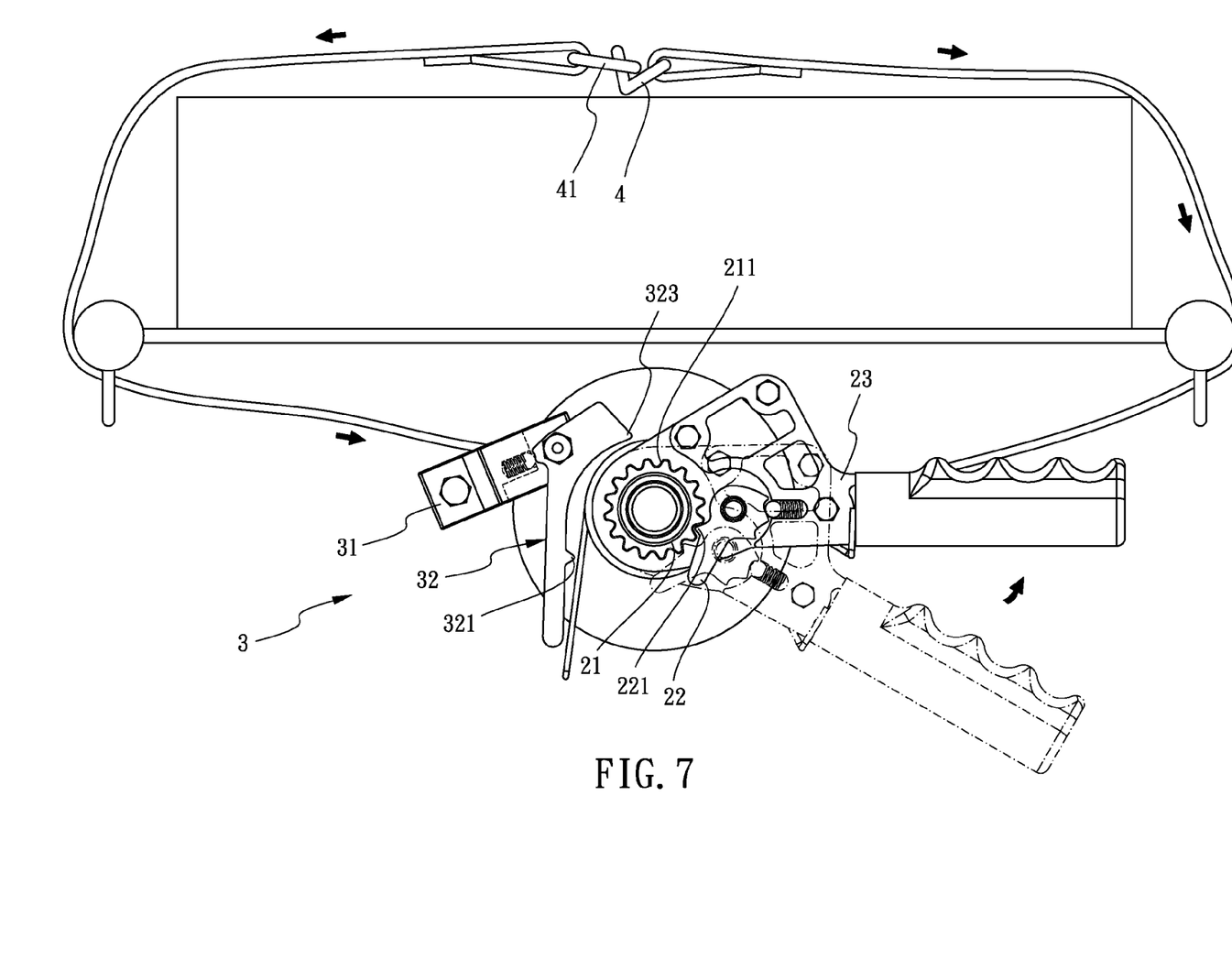
FIG. 7 is a top side view for showing the operation of manually fastening the binding belt.

According to the operation mentioned above, a detailed condition of each component is described as following:

1. Referring to FIG. 5 and FIG. 7, in order to adjust the binding belt smoothly to tighten the goods, the spring component 24 includes a first positioning ball 241 and a first spring 242. One end of the first spring 242 is abutted against the bottom of the first spring hole 231. Another end of the first spring 242 is abutted against the first positioning ball 241. The first positioning ball 241 is selectively abutted against each of the first positioning depressions 222 of the switching component 22 due to the elastic force from the first spring 242. When the gear tuner 221 of the switching component 22 is engaged with the gear 211, the first spring 242 is abutted against the first positioning ball 241 via the elastic force so that the first positioning ball 241 is abutted against the corresponding first positioning depression 222 and the gear tuner 221 of the switching component 22 is engaged with the gear 211. When the user operates the handling bar 2, the gear 211 is boosted in one direction by the gear tuner 221 of the switching component 22 for gradually rolling back the binding belt. On the other hand, when the user tunes the switching component 22 to separate the gear tuner 221 from the gear 211, the first positioning ball 241 abuts against the corresponding first positioning depression 222 so that the gear tuner 221 of the switching component 22 is not engaged with the gear 211 automatically.

Figure 1:
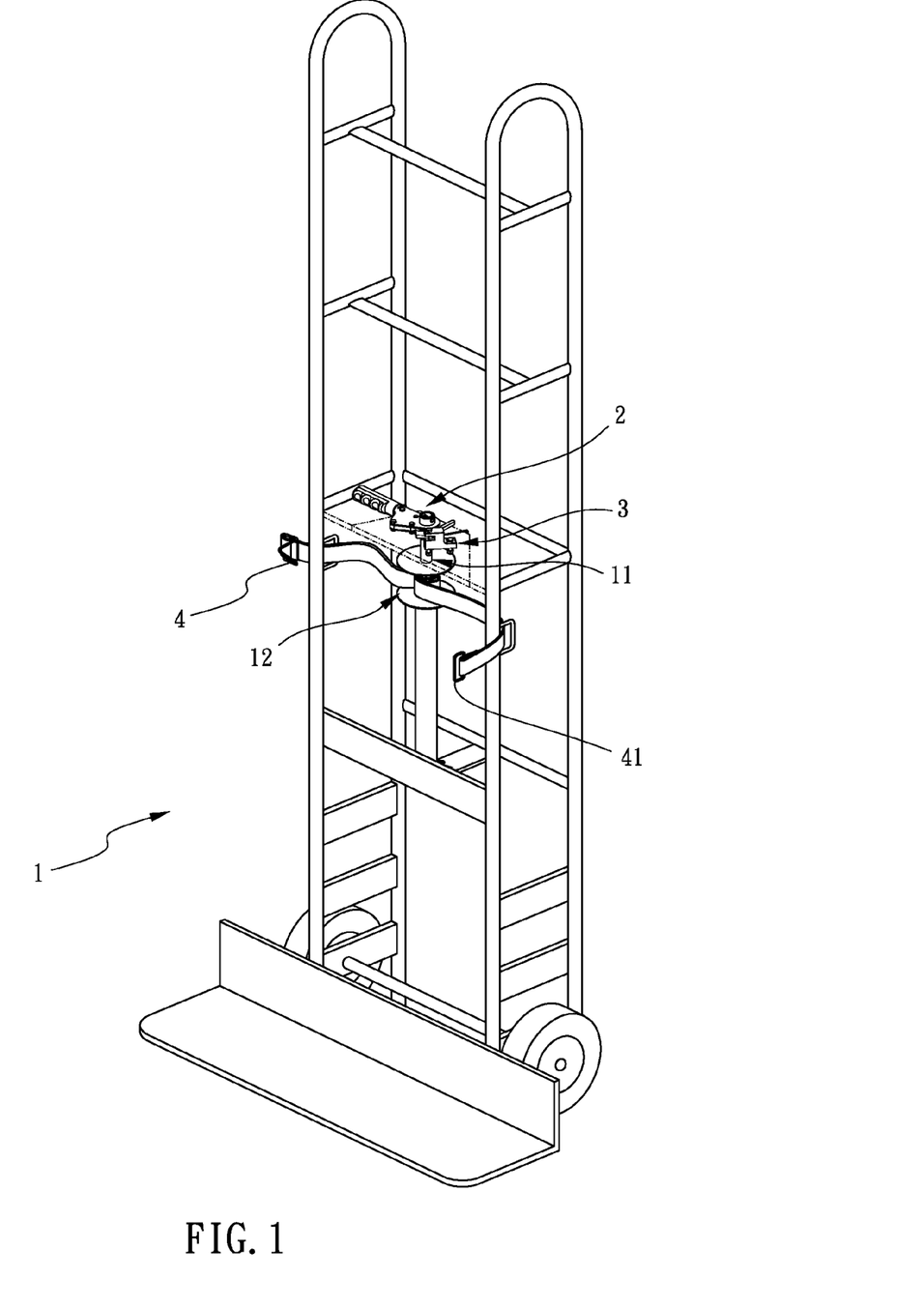
FIG. 1 is a perspective view of an adjustable binding belt set assembled to a cart body.
Figure 2:
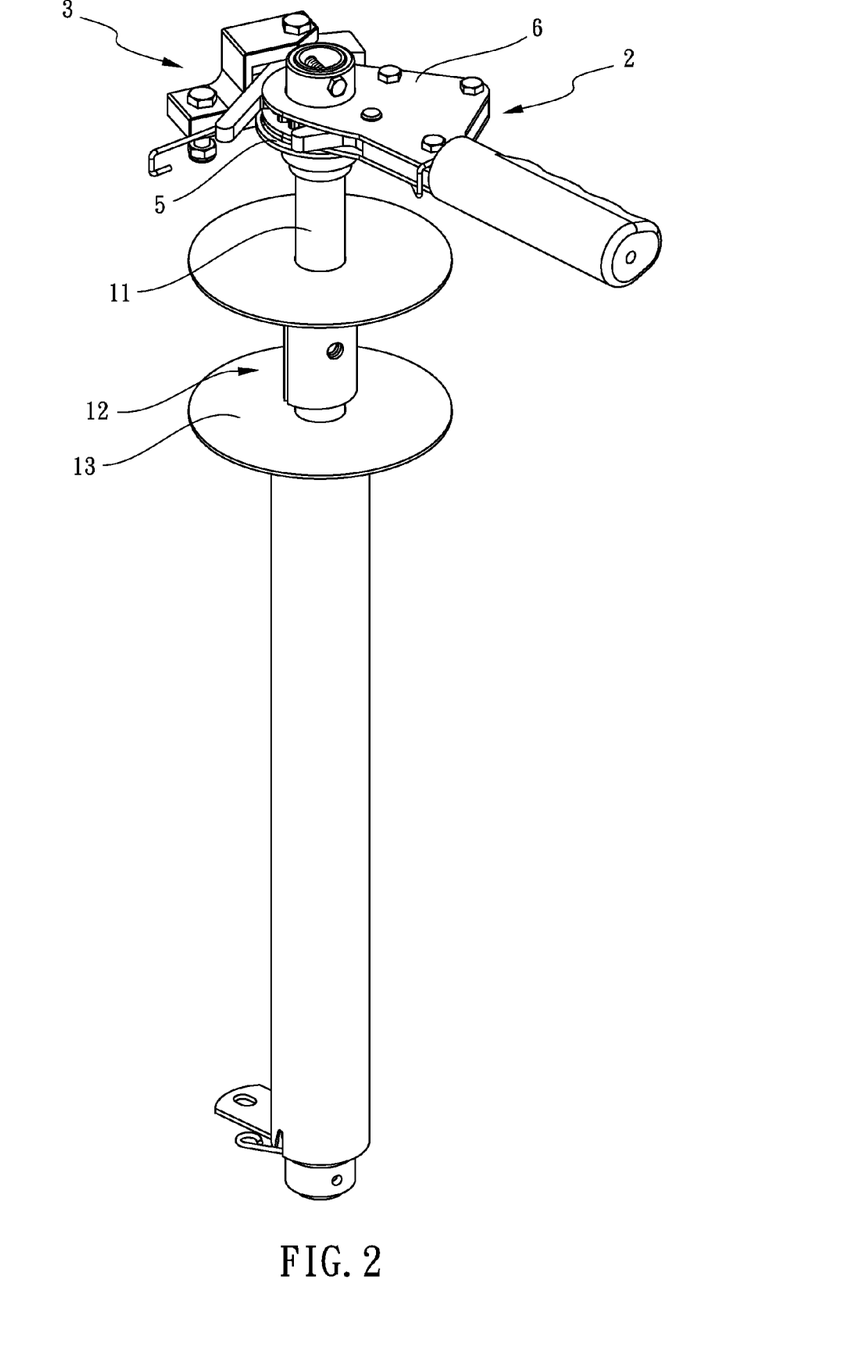
FIG. 2 is a perspective view of the adjustable binding belt set.
Figure 3:
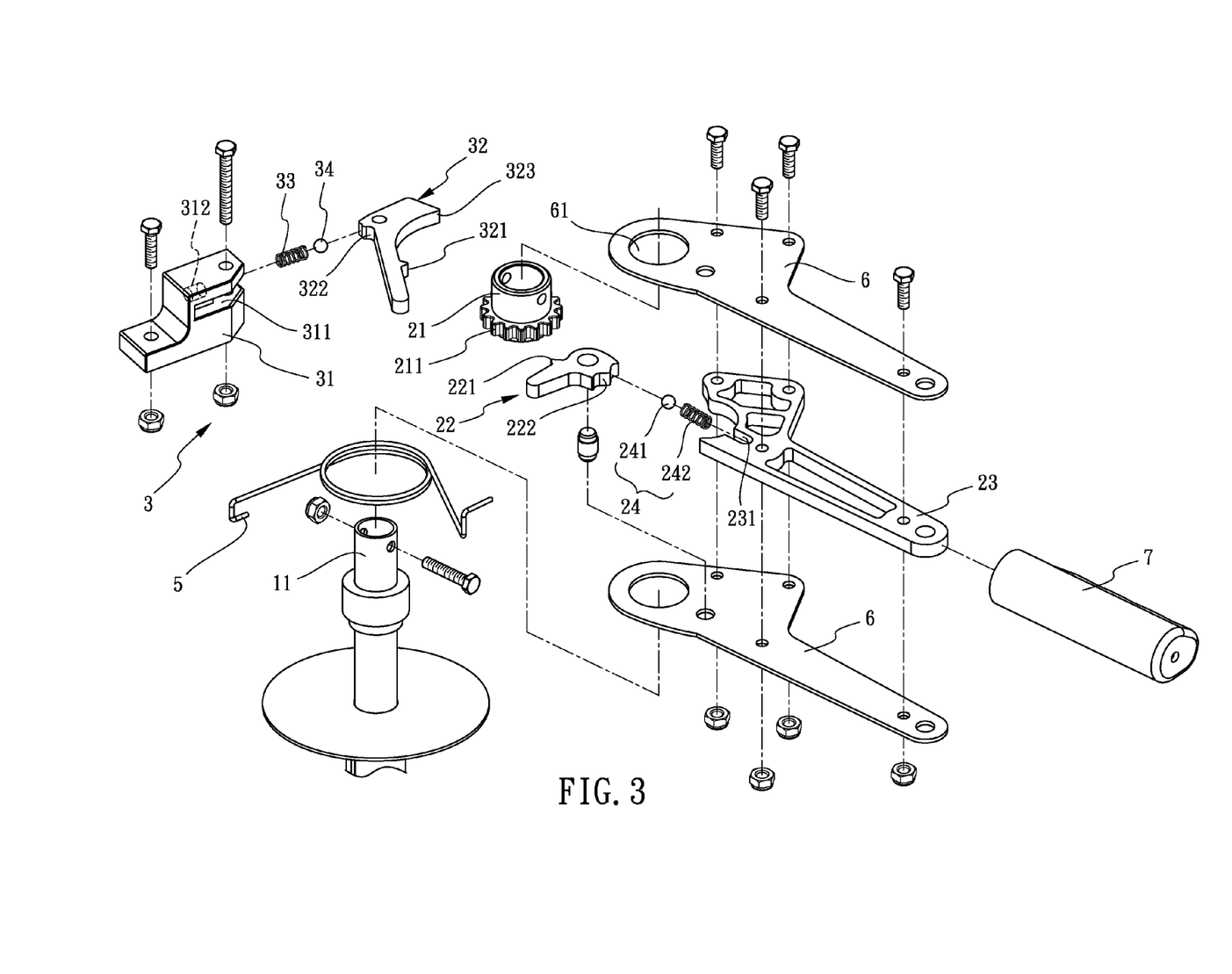
FIG. 3 is an exploded view of a handling bar and a fastening component of the adjustable binding belt set.

2. Referring to FIGS. 2-3 and FIG. 6, a flexible component 5 is further passing through the axial rod 11. One end of the flexible component 5 is assembled to the cart body 1. Another end of the flexible component 5 is locked at the handling bar 2. When the gear tuner 221 of the switching component 22 is engaged with the gear 211, the handling bar 2 will be controllable. An additional elastic force will generated from the flexible component 5, and this force helps the swinging of the handling bar 2. In this way, the user can swing the handling bar 2 to rotate the axial rod 11.

Figure 8:
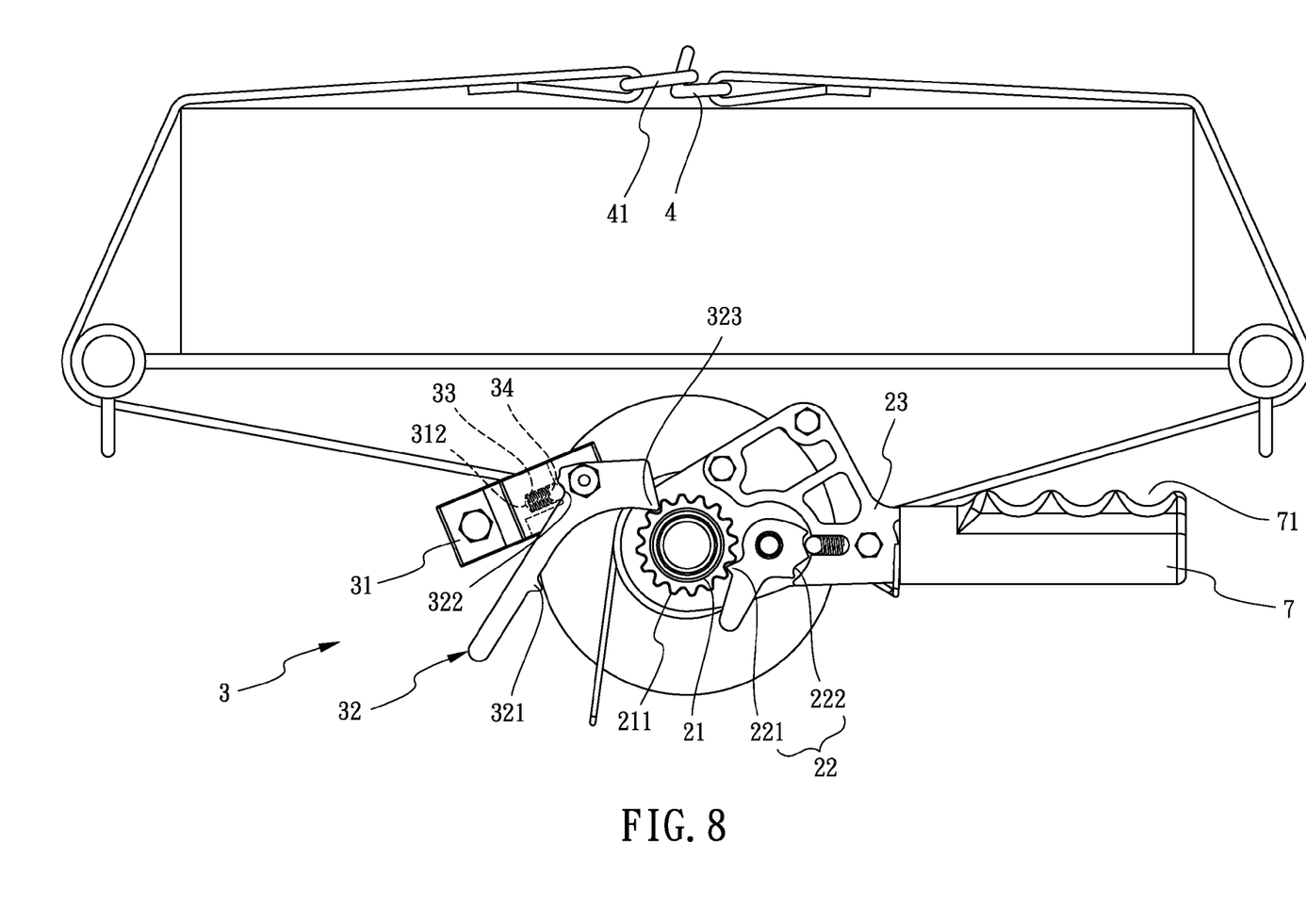
FIG. 8 is a top side view for showing that the handling bar is fixed instead of swing freely.

3. Referring to FIG. 5 and FIG. 8, the fastening slice 32 of the fastening component 3 is applied to fasten the gear 211 after the binding belt ties well with goods. In order to ensure the engagement between the resisting part 323 of the fastening slice 32 and the gear 211, a second spring hole 312 is defined inside the assembling groove 311 of the fastening base 31. The second spring hole 312 is located opposite to the fastening slice 32. A second spring 33 and a second positioning ball 34 are placed inside the second spring hole 312. Two second positioning depressions 322 are defined adjacent to each other on one side of the fastening slice 32 which is pivoted on the assembling groove 311. The second positioning ball 34 is selectively abutted against each of the second positioning depressions 322. One end of the second spring 33 is abutted against the bottom of the second spring hole 312. Another end of the second spring 33 abutted against the second positioning ball 34. When the user tunes the fastening slice 32 to make the resisting part 323 engage with the gear 211, the second spring 33 is abutted against the second positioning ball 34 via the elastic force so that the second positioning ball 34 is abutted against the corresponding second positioning depression 322. In this arrangement, the force generated from the engagement of the resisting part 323 and the gear 211 compensates with the force generated from engagement of the gear tuner 221 and the gear 211. Thus, the engagement between the resisting part 323 of the fastening slice 32 and the gear prevents the disengagement condition between the switching component 22 and the gear 211. The disengagement will cause the free swing motion of the handling bar 2 when the cart body 1 is moving on the unsmooth road.

4. Referring to FIGS. 2-4, two cover slices 6 are set on both side of the handling component 23 of the handling bar 2. A passing hole 61 is defined on each cover slice 6. The spine tube 21 is passing through the passing hole 61. Each cover slice 6 is locked at the top and the bottom of the handling component 23. The switching component 22 is pivoted between two cover slices 6. Moreover, the spring component 24 and the switching component 22 are sandwiched between two cover slices 6 to prevent those components from detaching during the work. (In this embodiment, the cover slices 6 are locked to the handling component 23 by screwing, however, other method can be applied to assemble them, like binding with glue or locking with buckle.)

5. Referring to FIGS. 4-8, a protecting wear 7 is covering the handling component 23. The protecting wear 7 is located opposite to the spring component 24. The ends of the cover slices 6 are coated by the protecting wear 7. A plurality of arc depressions 71 is set on one side of the protecting wear 7. Therefore, the user can operate the handling bar 2 stably and smoothly via fitting their fingers into the arc depressions 71 upon holding the handling bar 2.

The detail assembling between the binding belt and the axial rod 11 is described as below: A roll-back rod 12 is defined on the axial rod 11, and the binding belt is assembled inside the roll-back rod 12. Two blocks 13 are defined at each end of the roll-back rod 12. The distance between the two blocks 13 is larger than the width of the belt to receive the rolled-back belt completely. Since the thickness of the binding belt become thicker after rolling back, the cross section area of each block 13 is larger than the cross section area of a rolled-back belt, and the binding belt will not loosen.

Although the invention has been explained in relation to its preferred embodiment, it is to be understood that many other possible modifications and variations can be made without departing from the spirit and scope of the invention as hereinafter claimed.

What is claimed is:

1. An adjustable binding belt set comprising:
a handling bar, a fastening component, and a binding belt;
the handling bar pivoted on a axial rod of a cart body, the handling bar having a spine tube, a switching component and a handling component defined thereof, the spine tube passing through the axial rod of the cart body, a gear defined on the outer part of the spine tube to engage with the switching component;
a gear tuner extruded from the switching component, the gear tuner engaged with the gear, two first positioning depressions defined on the switching component, the first positioning depressions opposite to the gear tuner;
the handling component assembled to the switching component, the handling component located opposite to the gear tuner, a first spring hole corresponding to the switching component defined on the handling component, the first spring hole having a spring component placed into, one end of the spring component selectively abutted against each of the first positioning depressions to control the motion of the gear tuner; and
the fastening component assembled to the cart body and near the spine tube, the fastening component comprising a fastening base and a fastening slice, one side of the fastening base corresponding to the gear having an assembling groove defined thereon, the fastening slice pivoted on the assembling groove, a gear stopper extruded from one side of the fastening slice, the gear stopper engaged with the gear, another side of the fastening slice having a resisting part extruded therefrom, the resisting part being used to fix the gear from rotating;
wherein when the gear stopper of the fastening slice is engaged with the gear, the binding belt will not roll back automatically; after goods are packaged by the binding belt, the gear stopper of the fastening slice is tuned to separate from the gear such that the binding belt will roll back automatically and tightly fasten the goods; on the other hand, if the resisting part of the fastening slice is engaged with the gear and the switching component is also engaged with the gear, simultaneously, the handling bar will not swing because of the engagement among the resisting part, the gear and the switching component.

2. The adjustable binding belt set as claimed in claim 1, wherein the spring component comprises a first positioning ball and a first spring; one end of the first spring is abutted against the bottom of the first spring hole, another end of the first spring is abutted against the first positioning ball; the first positioning ball is selectively abutted against each of the first positioning depressions of the switching component due to the elastic force from the first spring; wherein a user tunes the switching component to make the gear tuner engage or disengage with the gear.

3. The adjustable binding belt set as claimed in claim 1, wherein a second spring hole is defined inside the assembling groove of the fastening base; the second spring hole is located opposite to the fastening slice; a spring and a positioning ball are placed inside the second spring hole; two second positioning depressions are defined adjacent to each other on one side of the fastening slice which is pivoted on the assembling groove; the positioning ball is selectively abutted against each of the second positioning depressions; one end of the spring is abutted against the bottom of the second spring hole, another end of the spring abutted against the positioning ball; wherein when a user tunes the fastening slice, the positioning ball will abut against a corresponding one of the second positioning depressions; the force generated from the engagement of the resisting part and the gear will compensate with the force generated from engagement of the gear tuner and the gear, and further fasten the switching component instead of providing for it to swing freely.

4. The adjustable binding belt set as claimed in claim 1, wherein two cover slices are set on both sides of the handling component of the handling bar; a passing hole is defined on each cover slice; the spine tube is passing through the passing hole; each cover slice is locked at the top and the bottom of the handling component; the switching component is pivoted between two cover slices.

5. The adjustable binding belt set as claimed in claim 4, wherein a protecting wear is covering the handling component; the protecting wear is located opposite to the spring component; ends of the cover slices are coated by the protecting wear.

6. The adjustable binding belt set as claimed in claim 1, wherein a flexible component is further passing through the axial rod; one end of the flexible component is assembled to the cart body, another end of the flexible component is locked at the handling bar; wherein an additional elastic force will generate from the flexible component and the elastic force will fix the handling bar instead of providing for it to swing freely.

7. The adjustable binding belt set as claimed in claim 1, wherein a roll-back rod is defined on the axial rod and the binding belt is assembled inside the roll-back rod; two blocks are defined at each end of the roll-back rod; a distance between the two blocks is larger than a width of the belt to completely receive the belt when rolled-back; a cross section area of each block is larger than a cross section area of a rolled-back belt.

* * * * *